(12) United States Patent
Kitazaki et al.

(10) Patent No.: US 6,902,786 B2
(45) Date of Patent: Jun. 7, 2005

(54) PRESSURE-SENSITIVE ADHESIVE COMPOSITIONS FOR SURFACE-PROTECTING FILMS

(75) Inventors: Yasuaki Kitazaki, Tokyo (JP); Kinnosuke Hino, Tokyo (JP); Syuji Ichimura, Tokyo (JP)

(73) Assignee: Nichiban Company, Limited, Tokyo (JP)

( * ) Notice: Subject to any disclaimer, the term of this patent is extended or adjusted under 35 U.S.C. 154(b) by 195 days.

(21) Appl. No.: 10/192,864

(22) Filed: Jul. 10, 2002

(65) Prior Publication Data

US 2003/0004266 A1 Jan. 2, 2003

Related U.S. Application Data

(63) Continuation of application No. 09/101,216, filed as application No. PCT/JP96/00001 on Jan. 4, 1996.

(51) Int. Cl.$^7$ .............................. B32B 25/16; C09J 7/00; C09J 109/06
(52) U.S. Cl. ............................ 428/41.7; 428/355 BL; 428/355 RA; 427/155; 427/156; 427/208.4; 525/332.9; 525/338; 525/232
(58) Field of Search ......................... 428/41.7, 355 BL, 428/355 RA; 427/155, 156, 208.4; 525/332.9, 338, 232

(56) References Cited

U.S. PATENT DOCUMENTS

| | | | |
|---|---|---|---|
| 3,513,141 A | 5/1970 | Wright et al. | 260/85.1 |
| 3,798,190 A | 3/1974 | Yoshimoto et al. | 260/5 |
| 3,935,176 A | 1/1976 | Hawkins et al. | 260/83.7 |
| 4,102,849 A | 7/1978 | Bouton et al. | 260/33.6 AQ |
| 5,496,601 A | 3/1996 | Schurb | 428/40 |
| 5,585,443 A | 12/1996 | Ozawa et al. | 525/314 |
| 5,610,212 A | 3/1997 | Tanaka et al. | 524/156 |
| 5,965,255 A | 10/1999 | Ichimura et al. | 428/353 |

FOREIGN PATENT DOCUMENTS

| | | |
|---|---|---|
| EP | 0 303 482 A2 | 2/1989 |
| EP | 0 440 189 A2 | 8/1991 |
| JP | 60123574 A | 7/1983 |
| JP | 62127376 | 11/1985 |
| JP | 2-70734 | 9/1990 |
| JP | 2-123173 | 10/1990 |

OTHER PUBLICATIONS

A copy of the International Search Report (Form PCT/ISA/210) dated Apr. 16, 1996 which indicates the two (2) references cited therin as noted above as references "BC" and "BD."

Derwent Abstract, J04292647, "Encyclopedia of Polymer Science and Engineering," Supplement Volume, Acid–Base Interactions to Vinyl Chloride Polymers, pp. 631–633.

*Primary Examiner*—David J. Buttner
(74) *Attorney, Agent, or Firm*—Edwards & Angell, LLP; David G. Conlin; Lisa Swiszcz Hazzard

(57) ABSTRACT

The present invention relates to a pressure-sensitive adhesive composition for a surface-protective film, the composition comprising 40% by weight or more of a hydrogenated random copolymer consisting of 1 to 50% by weight of styrene and 99 to 50% by weight of a diene hydrocarbon and 60% by weight or less of a tackifier resin and/or a softener, and when the pressure-sensitive adhesive composition of the present invention is applied to the surface-protective film, the composition is caused to exhibit excellent adhesion to adherends, not to leave stains of the adherends, nor to leaves traces thereon when the films are removed from the adherends, and can also impart excellent removability to surface-protective films.

24 Claims, No Drawings

PRESSURE-SENSITIVE ADHESIVE COMPOSITIONS FOR SURFACE-PROTECTING FILMS

CROSS REFERENCE TO RELATED APPLICATION

The present invention is a continuation of, claims priority from, and incorporates by reference the entirety of U.S. patent application Ser. No. 09/101,216, which was filed on Jul. 2, 1998, and which is now abandoned which is a 371 of PCT/JP96/00001, filed Jan. 4, 1996.

TECHNICAL FIELD

The present invention relates to a pressure-sensitive adhesive composition for a surface-protective film, more particularly to a pressure-sensitive adhesive composition employed for a surface-protective film for protecting metal surfaces, glass surfaces, coating surfaces, etc.

BACKGROUND ART

Conventional methods for protecting surfaces of top coatings formed as finish coatings on the surfaces of vehicles include coating thinly with paraffin wax. However, this method involves a problem in that the paraffin wax coating does not exhibit sufficient protecting function and that it costs much time and labor when the paraffin wax coating is to be removed.

Meanwhile, Japanese Patent Publication No. 74627/1993 discloses a method of applying a plastic film having a pressure-sensitive adhesive layer to an adherend. According to this method, the above problems can be solved. In this case, however, the pressure-sensitive adhesive layer is based on a hydrogenated block copolymer of styrene and a diene type hydrocarbon, so that the pressure-sensitive adhesive layer exhibits poor adhesion and poor removability against adherends and that the pressure-sensitive adhesive layer leaves stains of the adherends or leaves thereon traces of the films removed, disadvantageously.

The purpose of the present invention is to provide a pressure-sensitive adhesive composition for surface-protective films which is caused to exhibit excellent adhesion to adherends, not to smear the adherends nor to leave traces thereon when the films are removed from the adherends and can also impart excellent removability to surface-protective films.

DISCLOSURE OF THE INVENTION

The present invention relates to a pressure-sensitive adhesive composition for a surface-protective film, the composition comprising 40% by weight or more of a hydrogenated random copolymer consisting of 1 to 50% by weight of styrene and 99 to 50% by weight of a diene hydrocarbon, and 60% by weight or less of a tackifier resin and/or a softener.

BEST MODE FOR CARRYING OUT THE INVENTION

The present invention will be explained below specifically.

The hydrogenated random copolymer consisting of styrene and a diene type hydrocarbon employable according to the present invention preferably has a styrene content of 1 to 50% by weight and a melt flow rate (ASTM D1238, hereinafter abbreviated as MFR) of 2 to 10 g/10 minutes at 230° C. under a load of 2.16 kg. If the styrene content is less than 1% by weight, the resulting resin comes to have poor thermoplasticity, whereas if it is more than 50% by weight, the resulting copolymer comes to exhibit poor adhesion to adherends and to have an increased modulus of elasticity and reduced compatibility with the tackifier resin or the softener, so that such random copolymers having styrene contents not within the specified range are not preferred as components of pressure-sensitive adhesives for surface-protective films.

This diene hydrocarbon to be employed as a comonomer includes, for example, isoprene and butadiene, etc.

Tackifier resins employable include petroleum aliphatic resins, alicyclic resins, rosin resins, terpene resins, etc., particularly preferably hydrogenated resins thereof in view of weathering resistance.

Softening agents employable include oils, paraffin waxes, low-molecular weight polybutenes, low-molecular weight polyisoprenes, stearic acid, etc.

In the pressure-sensitive adhesive composition, if the amount of hydrogenated random copolymer consisting of styrene and a diene hydrocarbon is less than 40% by weight and the amount of tackifier resin or the softener is more than 60% by weight, the resulting composition comes to exhibit poor adhesion to adherends and smears them or leave traces thereon, unpractically, when surface-protective films are removed from the adherends.

The pressure-sensitive adhesive composition for surface-protective films of the present invention may, as necessary, be incorporated with a filler or a lubricant such as talc, stearic acid amide and calcium stearate; a pigment or a dye such as titanium dioxide; a reinforcing material, for example, inorganic hollow particles such as glass balloon and silica balloon; a microspherical polymer, an antioxidant, an ultraviolet absorber, an ultraviolet stabilizer, etc., so long as the objective of the present invention is not impaired.

Base materials employable in the surface-protective films having the pressure-sensitive adhesive compositions of the present invention include known plastic films such as of a polyethylene film, a polypropylene film, a polyester film, nylon and polyvinyl chloride; or such films incorporated with a filler or a pigment such as talc, calcium carbonate and titanium dioxide by means of kneading; and paper, fabric and printed matters thereof.

EXAMPLES

The present invention will be explained more specifically by way of Examples. It should be noted that expressions "part(s)" all mean "part(s) by weight."

Example 1

A pressure-sensitive adhesive composition containing 100 parts of a blend of 90% by weight of a hydrogenated random copolymer consisting of 10% by weight of styrene and 90% by weight of butadiene (trade name: DYNARON 1320P, available from Japan Synthetic Rubber Co., Ltd.) and 10% by weight of a hydrogenated terpene resin (trade name: CLIALON M-105, available from Yasuhara Chemical Co., Ltd.); 0.1 part of a benzotriazole ultraviolet absorber (trade name: TINUVIN P, available from Ciba-Geigy Japan, Ltd.); and 0.1 part of a hindered phenol antioxidant (trade name: IRGANOX 565, available from Ciba-Geigy Japan, Ltd.) was melted with heating. The resulting melt was applied to a 60 μm-thick base film consisting of 100 parts of polypropylene (trade name: IDEMITSU POLYPRO F-700N, available from Idemitsu Petrochemical Co., Ltd.); 0.1 part of a benzotriazole ultraviolet absorber (trade name: TINUVIN P, available from Ciba-Geigy Japan, Ltd.); and 0.1 part of a hindered phenol antioxidant (trade name: IRGANOX 1010, available from Ciba-Geigy Japan, Ltd.) to a thickness of 20 µm by means of extrusion coating.

Example 2

A pressure-sensitive adhesive composition containing 100 parts of a blend of 60% by weight of a hydrogenated random copolymer consisting of 10% by weight of styrene and 90% by weight of butadiene (trade name: DYNARON 1320P, available from Japan Synthetic Rubber Co., Ltd.) and 40% by weight of a hydrogenated petroleum resin (trade name: I-MARV P-100, available from Idemitsu Petrochemical Co., Ltd.); 0.05 part of a benzotriazole ultraviolet absorber (trade name: TINUVIN P, available from Ciba-Geigy Japan, Ltd.); and 0.1 part of a hindered phenol antioxidant (trade name: IRGANOX 565, available from Ciba-Geigy Japan, Ltd.) was melted with heating. The resulting melt was applied to the similar base film as used in Example 1 to a thickness of 20 µm by means of extrusion coating.

Example 3

A pressure-sensitive adhesive composition containing 100 parts of a blend of 80% by weight of a hydrogenated random copolymer consisting of 30% by weight of styrene and 70% by weight of butadiene (trade name: DYNARON 1910P, available from Japan Synthetic Rubber Co., Ltd.), 10% by weight of a hydrogenated petroleum resin (trade name: ESCOREZ 5300, available from TONEX) and 10% by weight of a liquid polyisoprene (trade name: LIR-30, available from Kuraray Co., Ltd.); 0.1 part of a benzotriazole ultraviolet absorber (trade name: TINUVIN P, available from Ciba-Geigy Japan, Ltd.); and 0.1 part of a hindered phenol antioxidant (trade name: IRGANOX 565, available from Ciba-Geigy Japan, Ltd.) was melted with heating. The resulting melt was applied to the same base film as used in Example 1 to a thickness of 20 µm by means of extrusion coating.

Comparative Example 1

A pressure-sensitive adhesive composition containing 100 parts of a blend of 20% by weight of a hydrogenated random copolymer consisting of 10% by weight of styrene and 90% by weight of butadiene (trade name: DYNARON 1320P, available from Japan Synthetic Rubber Co., Ltd.) and 80% by weight of a hydrogenated terpene resin (trade name: CLIALON M-105, available from Yasuhara Chemical Co., Ltd.); 0.05 part of a benzotriazole ultraviolet absorber (trade name: TINUVIN P, available from Ciba-Geigy Japan, Ltd.); and 0.05 part of a hindered phenol antioxidant (trade name: IRGANOX 565, available from Ciba-Geigy Japan, Ltd.) was melted with heating. The resulting melt was applied to the similar base film as used in Example 1 to a thickness of 20 µm by means of extrusion coating.

Comparative Example 2

A pressure-sensitive adhesive composition which is a blend of 90% by weight of a hydrogenated block copolymer consisting of 13% by weight of styrene and 87% by weight of butadiene (trade name: KRATON G1657, available from Shell Japan) and 10% by weight of a hydrogenated petroleum resin (trade name: I-MARV P-100, available from Idemitsu Petrochemical Co., Ltd.) was melted with heating.

The resulting melt was applied to the same base film as used in Example 1 to a thickness of 20 µm by means of extrusion coating.

The surface-protective films obtained in Examples 1 to 3 and Comparative Examples 1 and 2 were applied to coated surfaces, stainless steel sheets and glass plates to test their adhesion properties to the adherends and weathering resistance. It should be noted here that weathering resistance of each film was tested after carbon arc irradiation for 60 hours in a weatherometer in terms of removability, the degree of leaving stains occurred in the adherend after removal of the film and presence or absence of trace of the films removed.

The test results are shown in Table 1.

TABLE 1

| | Adhesion to adherend surfaces | Weathering resistance | | |
| --- | --- | --- | --- | --- |
| | | Removability | Stains | Trace |
| Example 1 | Good | Good | Nil | Nil |
| Example 2 | Good | Good | Nil | Nil |
| Example 3 | Good | Good | Nil | Nil |
| Comp. Example 1 | Poor | Good | Occurred | Occurred |
| Comp. Example 2 | Poor | Poor | Occurred | Occurred |

Adhesion to Adherend Surfaces:
  Adhesion to coating film, stainless steel sheet and glass plate surfaces
Removability, Stains and Trace:
  Evaluated after 60-hours carbon arc irradiation in a weatherometer As is clear from the results of Examples 1 to 3 in Table 1, the surface-protective films employing the pressure-sensitive adhesive compositions of the present invention showed excellent adhesion to adherends and excellent weathering resistance, and they also showed removability from the adherends and did not leave stains the adherends nor left traces of the films removed.

Meanwhile, in the case of the pressure-sensitive adhesive composition containing less than 40% by weight of the hydrogenated random copolymer consisting of styrene and a diene hydrocarbon like that in Comparative Example 1, it showed poor adhesion to the adherends and it also smeared the adherends and left traces of the films removed, thus indicating that such pressure-sensitive adhesive compositions are not suitable as pressure-sensitive adhesives for surface-protective films.

Further, in the case of the pressure-sensitive adhesive composition containing the hydrogenated block copolymer consisting of styrene and a diene hydrocarbon as an elastomer component like that in Comparative Example 2, it showed poor adhesion to the adherends, and demonstrated poor removability after the carbon arc irradiation, left stains on the adherends, and left traces when the films were removed, thus indicating that such pressure-sensitive adhesive compositions are not suitable as pressure-sensitive adhesives for surface-protective films.

INDUSTRIAL APPLICABILITY

The pressure-sensitive adhesive composition for surface-protective films according to the present invention is caused to exhibit excellent adhesion to adherends, not to leave stains of the adherends, and not to leave traces thereon when the films are removed from the adherends, because of the hydrogenated random copolymer consisting of styrene and a diene type hydrocarbon incorporated as an elastomer component, and can also impart excellent removability to surface protective films.

In other words, since surface-protective films employing the pressure-sensitive adhesive compositions of the present invention exhibit excellent adhesion to coating films, stainless steel sheets, glass plates, etc. and also show excellent removability after carbon arc irradiation, the films can be applied to and removed from adherends easily and can also be used repeatedly. In addition, these films have excellent properties as surface-protective films since they do not leave stains of adherends nor leave traces after they are removed.

Meanwhile, since the pressure-sensitive adhesive compositions of the present invention are thermoplastic, they can be applied to base materials by means of melt extrusion using a T-die or extrusion coating as well as melt spread-coating. Further, if a base material of a thermoplastic composition is selected, a surface-protective film can be formed by a single step by co-extruding hot melts of raw material resins. Accordingly, the step of forming a film on the base material and the step of applying the pressure-sensitive adhesive to the base material can be carried out simultaneously.

What is claimed is:

1. A method of forming a surface-protective film, comprising the steps of:
    providing a pressure-sensitive adhesive having a composition comprising:
        (a) at least 40% by weight of a hydrogenated random copolymer, wherein the hydrogenated random copolymer consists of:
            1 to 50% by weight of styrene, and
            99 to 50% by weight of a diene hydrocarbon; and
        (b) 10 to 60% by weight of a tackifier resin, a softening agent, or a combination of a tackifier resin and a softening agent; and
    applying the pressure-sensitive adhesive to a base material to form a surface-protective film.
2. The method of claim 1, wherein the pressure-sensitive adhesive is applied to the base material via a melt extrusion technique or a melt-spread coating technique.
3. The method of claim 2, wherein the melt extrusion technique is a T-die technique or an extrusion coating technique.
4. The method of claim 1, wherein the diene hydrocarbon is isoprene or butadiene.
5. The method of claim 1, wherein the tackifier resin is a petroleum aliphatic resin, an alicyclic resin, a rosin resin, a terpene resin, or a hydrogenated resin, and wherein the softening agent is an oil, a paraffin wax, a low-molecular weight polybutene, a low-molecular weight polyisoprene, or a stearic acid.
6. The method of claim 1, wherein the hydrogenated random copolymer has a melt flow rate of 2 to 10 g/10 minutes when measured in accordance with ASTM D1238 at 230° C. under a load of 2.16 kg.
7. The method of claim 1, wherein the pressure-sensitive adhesive further includes a filler, a lubricant, a pigment, a dye, a reinforcing material, a microspherical polymer, an antioxidant, an ultraviolet absorber, or an ultraviolet stabilizer.
8. The method of claim 1, wherein the base material is a plastic film, a film incorporated with a filler, a film incorporated with a pigment, a paper, fabric, or printed matter.
9. The method of claim 8, wherein the plastic film is made of polyethylene, polypropylene, polyester, nylon, or polyvinyl chloride.
10. The method of claim 1, further comprising the step of:
    applying the pressure-sensitive film to a surface to form a protective coating for the surface.
11. The method of claim 10, wherein the surface is a metal-based surface or a glass-based surface.
12. The method of claim 10, wherein the surface is a surface of a vehicle.
13. A film for protecting a surface, comprising:
    a pressure-sensitive adhesive having a composition comprising:
        (a) at least 40% by weight of a hydrogenated random copolymer, wherein the hydrogenated random copolymer consists of:
            1 to 50% by weight of styrene;
            99 to 50% by weight of a diene hydrocarbon; and
        (b) 10 to 60% by weight of a tackifier resin a softening agent, or a combination of a tackifier resin and a softening agent; and
    a base material on which the adhesive has been applied to form a film suitable for use as a coating on a surface.
14. The film of claim 13, wherein the film is suitable for use as a temporary coating on a surface.
15. The film of claim 13, wherein the pressure-sensitive adhesive is applied to the base film via a melt extrusion technique or a melt-spread coating technique.
16. The film of claim 15, wherein the melt extrusion technique is a T-die technique or an extrusion coating technique.
17. The film of claim 13, wherein the diene hydrocarbon is isoprene or butadiene.
18. The film of claim 13, wherein the tackifier resin is a petroleum aliphatic resin, an alicyclic resin, a rosin resin, a terpene resin, or a hydrogenated resin, and wherein the softening agent is an oil, a paraffin wax, a low-molecular weight polybutene, a low-molecular weight polyisoprene, or a stearic acid.
19. The film of claim 13, wherein the hydrogenated random copolymer has a melt flow rate of 2 to 10 g/10 minutes when measured in accordance with ASTM D1238 at 230° C. under a load of 2.16 kg.
20. The film of claim 13, wherein the pressure-sensitive adhesive further includes a filler, a lubricant, a pigment, a dye, a reinforcing material, a microspherical polymer, an antioxidant, an ultraviolet absorber, or an ultraviolet stabilizer.
21. The film of claim 13, wherein the base material is a plastic film, a film incorporated with a filler, a film incorporated with a pigment, a paper, fabric, or printed matter.
22. The film of claim 21, wherein the plastic film is made of polyethylene, polypropylene, polyester, nylon, or polyvinyl chloride.
23. The film of claim 13, wherein the surface is a metal-based surface or a glass-based surface.
24. The film of claim 23, wherein the surface is a surface of a vehicle.

* * * * *